United States Patent [19]

Naarmann et al.

[11] Patent Number: 4,724,062

[45] Date of Patent: Feb. 9, 1988

[54] ELECTROCHEMICAL COATING OF CARBON FIBERS

[75] Inventors: Herbert Naarmann, Wattenheim; Franz Haaf, Bad Durkheim; Gerhard Fahrbach, Plankstadt, all of Fed. Rep. of Germany

[73] Assignee: BASF Aktiengesellschaft, Ludwigshafen, Fed. Rep. of Germany

[21] Appl. No.: 899,605

[22] Filed: Aug. 25, 1986

[30] Foreign Application Priority Data

Aug. 30, 1985 [DE] Fed. Rep. of Germany ....... 3531019

[51] Int. Cl.$^4$ ................................................ C25D 9/02
[52] U.S. Cl. .................................. 204/58.5; 204/59 R
[58] Field of Search ................... 204/72, 181.6, 180.2, 204/180.4, 181.1, 181.4, 180.9, 59 R, 58.5

[56] References Cited

U.S. PATENT DOCUMENTS

| | | | |
|---|---|---|---|
| 3,574,072 | 4/1971 | Louvar | 204/72 |
| 4,272,346 | 6/1981 | Jakubowski et al. | 204/181.6 |
| 4,401,545 | 8/1983 | Naarmann et al. | 204/291 |
| 4,547,270 | 10/1985 | Naarmann | 204/72 |
| 4,578,433 | 3/1986 | Muenstedt et al. | 204/72 |
| 4,582,575 | 4/1986 | Warren et al. | 204/72 |

*Primary Examiner*—John F. Niebling
*Assistant Examiner*—Ben Hsing
*Attorney, Agent, or Firm*—Keil & Weinkauf

[57] ABSTRACT

A layer of electrically conductive polymers is applied by a process in which carbon fibers of filaments or sheet-like structures of carbon fibers or filaments are coated with sulfonic acids of phthalocyanines or porphyrins, the filaments treated in this manner are made the anode in a solution which contains monomers from the class consisting of the 5-membered heterocycles, and the monomers are anodically polymerized so that a conductive layer is formed on the fibers, filaments or sheet-like structures.

3 Claims, No Drawings

ELECTROCHEMICAL COATING OF CARBON FIBERS

The present invention relates to a process for applying a layer of electrically conductive polymers onto fibers, filaments or sheet-like structures.

The electrochemical polymerization of pyrrole in the presence or absence of comonomers is known (cf. U.S. Pat. No. 3,574,072, DE-A-3,049,551). In this polymerization, pyrrole or the pyrrole/comonomer mixture in an electrolyte solvent, which is generally an organic one, is subjected to electrolysis in the presence of a conductive salt, the pyrrole polymer being formed by anodic oxidation and being deposited on the anode. The conductive salts, for example the alkali metal, ammonium or phosphonium salts having anions from the group consisting of $BF_4^-$, $AsF_6^-$, $SbF_6^-$, $PF_6^-$, $SbCl_6^-$, $ClO_4^-$, $HSO_4^-$ and $SO_4^{2-}$, are partially or completely incorporated in the pyrrol polymer, probably in the form of a complex, and impart a high electrical conductivity of up to about $10^2$ $Ohm^{-1} cm^{-1}$ to the pyrrole polymers prepared in this manner.

A previous Patent Application P 33 27 012 (EP-A-84 108 455) discloses a process for the electrochemical polymerization of pyrrole, in which pyrrole is polymerized in the presence of a conductive salt in an electrolyte solvent by anodic oxidation on a sheet-like anode, sheet-like structures having a large surface, such as woven fabrics, knitted fabrics, plaited fabrics or nets, being used.

It is an object of the present invention to provide a process for applying a layer of electrically conductive polymers onto fibers, filaments or sheet-like structures, which can be carried out in a technically simple manner, results in good adhesion of the layer of conductive polymer to the fibers, filaments or sheet-like structures and gives products possessing good electrical conductivity.

We have found that this object is achieved by a process in which fairly high molecular weight sulfonic acids are applied onto carbon fibers or filaments or sheet-like structures of carbon fibers or filaments, the fibers, filaments or sheet-like structures are made the anode in a solution which contains monomers from the class consisting of the 5-membered heterocycles containing nitrogen or sulfur as a heteroatom, and the monomers are anodically polymerized.

The process according to the invention gives carbon fibers or filaments and sheet-like structures of carbon fibers or filaments which possess particularly high electrical conductivity.

The electrochemically applied polymer layer exhibits good mechanical adhesion. The coated material can be rotated, rolled or bent without being damaged. In the process, the fairly high molecular weight sulfonic acids are firmly anchored in the fiber cavities and cannot be eluted with aqueous systems.

The process can be used to coat carbon fibers or filaments with an electrically conductive layer. Carbon fibers or filaments are obtained, for example, by pyrolytic methods, by heating filaments or woven fabrics at above 600° C.

However, the process can also be used to coat sheet-like structures of carbon fibers or filaments with an electrically conductive polymer layer. Examples of such sheet-like structures are woven fabrics, knitted fabrics, plaited fabrics, nets or mat-like materials. Such sheet-like structures are obtained, for example, by a conventional method, and may likewise be obtained by pyrolysis sis methods if sheet-like fabrics are used directly in the pyrolysis process.

First, fairly high molecular weight sulfonic acids are applied onto the carbon fibers or filaments or onto the sheet-like structures. These sulfonic acids have a molecular weight of from 250 to 10,000, preferably from 300 to 50,000, and carry one sulfonic acid group per molecular weight unit of from 250 to 500. High molecular weight sulfonic acids of this type are obtained, for example, when polystyrene is treated with $SO_3$, products of this type being known. Sulfonic acids of phthalocyanine or porphyrins are preferably used in the process of the invention.

These are the sulfonation products of phthalocyanines or porphyrins, and are described in more detail in Chemie Lexikon by H. Römb, 6th edition, volume 3, page 4918 et seq. The sulfonic acids of metal phthalocyanines and those of the copper derivative of tetrabenzo- and tetraazaporphyrin are particularly advantageous. Zn, Co, Ni and Pt phthalocyanines are also suitable.

The sulfonic acids of phthalocyanines or of porphyrins are most advantageously applied from a solution, which contains from 0.01 to 20% of the sulfonic acids. Examples of suitable solvents are aqueous or organic systems. Where the sulfonic acids are used in the form of their alkali metal salts, eg. the Na or K salts, or in the form of the ammonium salts, water is advantageously used as the solvent. Acetonitrile, methylene chloride or mixtures of these with, for example, dimethylformamide or N-methylpyrrolidone can also be used if the free sulfonic acids or the ammonium salts are employed.

The fibers, filaments or sheet-like structures treated in this manner are then dried so that the filaments or filament portions are coated with a layer of the sulfonic acids of the phthalocyanine or porphyrin.

The fibers or sheet-like structures are then dipped into a solution which contains monomers.

The monomers are selected from the class consisting of the 5-membered heterocyclic compounds which contain nitrogen or sulfur as the heteroatom and furthermore possess a $\pi$-electron system of conjugated compounds. Examples of these compounds are those from the class consisting of the pyrroles and the thiophenes. Examples of suitable pyrroles are unsubstituted pyrrole itself as well as N-substituted pyrroles, such as N-alkylpyrrole. However, other substituted pyrroles, eg. 3,4-dialkylpyrroles or 3,4-dichloropyrroles, may also be used. Particularly suitable compounds from the class consisting of the thiophenes are unsubstituted thiophene itself and 2- and 3-alkylthiophenes, eg. 2,3-diethylthiophene. These stated 5-membered heterocyclic compounds may also be polymerized together with other copolymerizable compounds, eg. furans, thiazole, oxazole or imidazole.

Examples of suitable solvents are organic solvents, such as methanol, ethanol, polyols, acetone or tetrahydrofuran. Pyridine, acetonitrile, methylene chloride, glacial acetic acid, propylene carbonate and dimethyl sulfoxide are also useful. However, water or mixtures of water with one of the abovementioned miscible solvents may also be used.

The solutions may contain an electrolyte in order to increase the conductivity. The known conductive salts, in particular the alkali metal and ammonium salts of $PF_6^-$ $ClO_4^-$, $PF_4^-$ and $AsF_6^-$, are useful for this purpose. Anions of organic acids, such as benzenesulfonic acid, toluenesulfonic acid or trifluoroethanesulfonic acid, are also suitable. Where conductive salts are used, they are present in the solution in amounts of from 0.01 to 1 mole.

The fibers, filaments or sheet-like structures coated with the sulfonic acids of the phthalocyanines or porphyrins are made the anode in the solution. The monomers are subjected to electrochemical polymerization. This is carried out, for example, by using a current density of from 0.01 to 20 mA/cm$^2$ and applying a voltage of, in general, from 0.5 to 50 V. The cathode used is advantageously an electron conductor which is stable to reduction, eg. nickel, stainless steel, platinum or a carbon material. The polymerization of the monomers may also be carried out using an alternating current. The current densities and voltages may be in the stated range. Frequencies of 50 to 100,000 Hz are advantageously used. Such processes for the anodic polymerization of monomers are known and are described in, for example, the above literature.

The preparation by the process according to the invention gives products which are thermally stable and show no loss of conductivity at 180° C. The same applies to the stability of the conductivity in aqueous systems.

EXAMPLE 1

100 parts of carbon fibers having a diameter of 100 μm are dipped into a 10% strength aqueous solution of the trisulfonic acid of copper phthalocyanine. The fibers are removed from the solution and dried for 3 hours at 100° C., after which they are introduced into an electrolysis bath which contains 0.05 part by weight of pyrrole and 0.01 part by weight of tributylammonium phenylsulfonate per 100 parts by weight of acetonitrile. The carbon fibers are made the anode and a current density of 2 mA/cm$^2$ is maintained. Anodic oxidation of the pyrrole takes 30 minutes.

A layer of the electrically conductive polypyrrole is then found to have formed on the fibers. The fibers treated in this manner have a conductivity of 150 S/cm, the conductivity remaining unchanged during storage at 100° C. in the air for a period of 3 months. The initial fibers have a conductivity of from 10 to 20 S/cm.

EXAMPLES 2 to 9

The procedure described in Example 1 is followed except that the variants stated in the table are carried out.

| No. | Matrix | Sulfonic acid | Electrolyte | Current density in mA/cm$^2$ | Conductivity S/cm |
|---|---|---|---|---|---|
| 2 | Carbon fabric | Disulfonic acid of Cu phthalocyanine | Acetonitrile + 1% of dimethylformamide | 5 | 180 |
| 3 | " | Disulfonic acid of Cu phthalocyanine | Acetonitrile + 1% of dimethylformamide | 10 | 165 |
| 4 | " | Tetrasulfonic acid of phenylporphyrin | Acetonitrile | 2 | 120 |
| 5 | " | Tetrasulfonic acid of Fe phenylporphyrin | " | 2 | 130 |
| 6 | " | Tetrasulfonic acid of Zn phenylporphyrin | " | 4 | 110 |
| 7 | " | Tetrasulfonic acid of Co phenylporphyrin | " | 2 | 140 |
| 8 | Carbon fibers | Na salt of the trisulfonic acid of Cu phthalocyanine | " | 5 | 120 |
| 9 | Carbon fabric | Disulfonic acid of Cu phthalocyanine | Propylene carbonate | 2 | 85 |

In Example 9, thiophene is used as the monomer, and the tetrabutylammonium salt of the PF$_6$ acid as the conductive salt.

Polymer coatings adhering firmly to the fibers are obtained in every example.

We claim:

1. A process for applying a layer of an electrically conductive polymer to fibers, filaments or sheet-like structures, wherein a solution of a sulfonic acid of a phthalocyanine or porphyrin is applied to carbon fibers or filaments or sheet-like structures of carbon fibers or filaments, the fibers, filaments or sheet-like structures are then dried, so that they are coated with a layer of the sulfonic acid of the phthalocyanine or porphyrin, and the coated material is then made the anode in a solution which contains monomers from the class consisting of the 5-membered heterocycles containing nitrogen or sulfur as a heteroatom, and the monomers are anodically polymerized.

2. The process of claim 1, wherein a sulfonic acid of Cu, Co, Zn, Ni or Pd phthalocyanine is used.

3. The process of claim 1, wherein the monomer is pyrrole or thiophene.

* * * * *